United States Patent
Stiehl et al.

(10) Patent No.: US 7,519,797 B1
(45) Date of Patent: Apr. 14, 2009

(54) HIERARCHICAL MULTI-PRECISION PIPELINE COUNTERS

(75) Inventors: Gregory J. Stiehl, Austin, TX (US);
David L. Anderson, Durham, NC (US);
Cass W. Everitt, Round Rock, TX (US);
Mark J. French, Raleigh, NC (US);
Steven E. Molnar, Chapel Hill, NC (US)

(73) Assignee: NVIDIA Corporation, Santa Clara, CA (US)

(*) Notice: Subject to any disclaimer, the term of this patent is extended or adjusted under 35 U.S.C. 154(b) by 189 days.

(21) Appl. No.: 11/556,020

(22) Filed: Nov. 2, 2006

(51) Int. Cl.
*G06F 9/00* (2006.01)
*G06F 15/76* (2006.01)

(52) U.S. Cl. .................. 712/227; 712/4; 712/225
(58) Field of Classification Search ........... 712/227, 712/4, 225
See application file for complete search history.

(56) References Cited

U.S. PATENT DOCUMENTS

| | | | | |
|---|---|---|---|---|
| 5,493,673 | A * | 2/1996 | Rindos et al. ............... 713/502 |
| 5,768,500 | A * | 6/1998 | Agrawal et al. ............... 714/47 |
| 5,937,437 | A * | 8/1999 | Roth et al. .................. 711/202 |
| 6,253,338 | B1 * | 6/2001 | Smolders ....................... 714/45 |
| 6,446,029 | B1 * | 9/2002 | Davidson et al. ............. 702/186 |
| 6,452,595 | B1 * | 9/2002 | Montrym et al. ............. 345/426 |
| 6,539,502 | B1 * | 3/2003 | Davidson et al. .............. 714/47 |
| 6,748,522 | B1 * | 6/2004 | Gregoire et al. ............. 712/227 |
| 6,772,322 | B1 * | 8/2004 | Merchant et al. ............. 712/227 |
| 6,925,424 | B2 * | 8/2005 | Jones et al. .................. 702/187 |
| 7,051,177 | B2 * | 5/2006 | Le et al. ...................... 711/167 |
| 7,086,035 | B1 * | 8/2006 | Mericas ....................... 717/127 |
| 2003/0051192 | A1 * | 3/2003 | Pillay et al. ................... 714/39 |
| 2004/0123084 | A1 * | 6/2004 | DeWitt et al. ............... 712/227 |
| 2004/0213370 | A1 * | 10/2004 | Smallwood et al. ......... 377/118 |
| 2005/0155020 | A1 * | 7/2005 | DeWitt et al. ............... 717/130 |
| 2007/0139421 | A1 * | 6/2007 | Chen et al. ................... 345/501 |
| 2007/0260849 | A1 * | 11/2007 | Chen et al. ................... 712/34 |
| 2008/0133180 | A1 * | 6/2008 | Floyd et al. ................. 702/186 |
| 2008/0141001 | A1 * | 6/2008 | Chung et al. ................ 712/216 |

* cited by examiner

*Primary Examiner*—Eddie P Chan
*Assistant Examiner*—Idriss N Alrobaye
(74) *Attorney, Agent, or Firm*—Patterson & Sheridan, LLP

(57) ABSTRACT

An event occurring in a graphics pipeline is detected and counted at the location of its occurrence using an event detector and a local counter. The event count maintained by the local counter is reported asynchronously to a global counter. The global counter is configured to be of higher precision than the local counter and is positioned at a place that is convenient for reporting the events, e.g., at the end of the graphics pipeline.

9 Claims, 6 Drawing Sheets

US 7,519,797 B1

HIERARCHICAL MULTI-PRECISION PIPELINE COUNTERS

BACKGROUND OF THE INVENTION

1. Field of the Invention

Embodiments of the present invention relate generally to event reporting during graphics processing and more specifically to a system and method for using hierarchical multi-precision pipeline counters for event reporting.

2. Description of the Related Art

Graphics application programming interfaces ("APIs") such as DirectX10™ allow the API to poll the graphics hardware to determine how many events of a specified type have occurred since the graphics hardware was last polled for that event type. The process of polling the graphics hardware includes the steps of the API issuing a command to the graphics hardware, and the graphics hardware responding to the command by reading an internal register and storing the value of the internal register into a memory location specified by the API.

Certain event types that can be polled are generated in locations from which it is impractical to report the results. One example is the reporting of the "Z pass pixel count," which represents the number of Z pixels that pass the Z test. Importantly, some of the Z pixels that pass the test are culled near the top of the pipeline and never reach the end of the pipeline, so a counter at the end of the pipeline, where the results can be conveniently communicated to the API, is incapable of counting these Z pixels.

FIG. 1 illustrates a conventional event reporting mechanism in a programmable graphics processing pipeline 100 that provides a solution to this problem. As shown, the programmable graphics processing pipeline 100 includes execution pipelines 102 and 104 and a crossbar 106. The execution pipeline 102 includes multiple stages, shown here as a first stage 108, a second stage 110, a third stage 112 that includes an event detector 114, a fourth stage 116 and a fifth stage 118. The execution pipeline 104 includes multiple stages, shown here as a first stage 120, a second stage 122, a third stage 124 that includes an event detector 126, a fourth stage 128 and a fifth stage 130. The crossbar 106 includes an event counter 132.

As an instruction is executed in the pipeline stages of the execution pipelines 102, 104, a reportable event may occur in one of the pipeline stages. If a reportable event occurs, the event is detected by an event detector (e.g., event detector 114 or 126) and then communicated to the event counter 132 through a dedicated wire from the corresponding event detector to the event counter. When the API requests reporting of the event count, the value of the event counter 132 is written into a specified memory location.

SUMMARY OF THE INVENTION

The present invention provides another solution to the problem described above. According to embodiments of the present invention, an event occurring in an execution pipeline is detected and counted at the location of its occurrence using an event detector and a local counter, and the event count that is maintained by the local counter is reported asynchronously to a global counter. The global counter may be positioned at a place that is convenient for reporting to the API, e.g., at the end of the execution pipeline.

A computing device according to an embodiment of the present invention is configured for operation with an operating system that includes an application programming interface (API) for graphics processing, and comprises an execution pipeline for graphics processing having a plurality of stages, an event detector for monitoring a pipeline stage for a specified event, an m-bit counter that is incremented when the event detector detects the specified event at the pipeline stage, and an n-bit accumulation counter for receiving a count value from the m-bit counter and adding the count value to a current count value of the n-bit accumulation counter. The n-bit accumulation counter is configured to be larger in size than the m-bit counters, and to report its current count value in response to a request from the API.

A processing unit according to an embodiment of the present invention includes a plurality of execution pipelines having multiple stages that include a first stage and a second stage, a first event detector for monitoring a first stage for a specified event, a second event detector for monitoring a second stage for a specified event, a first counter that is incremented when the first event detector detects the specified event at the first stage, a second counter that is incremented when the second event detector detects the specified event at the second stage, and an accumulation counter for receiving a count value from each of the first counter and the second counter and adding the received count value to a current count value of the accumulation counter. Each of the first and second counters is configured to transmit its count value into its respective execution pipeline for receipt by the accumulation counter when it has saturated, or when a report token is received at its respective stage.

The method of generating an event report in the computing device or processing unit described above includes the steps of monitoring a pipeline stage in the execution pipeline for a specified event, incrementing a local counter when the specified event is detected at the pipeline stage, communicating a count value of the local counter to a global counter, increasing a count value of the global counter with the count value of the local counter, and generating the event report using the count value of the global counter. The count value of the local counter is communicated to the global counter by injecting a count token that contains an encoded form of the count value into the execution pipeline.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
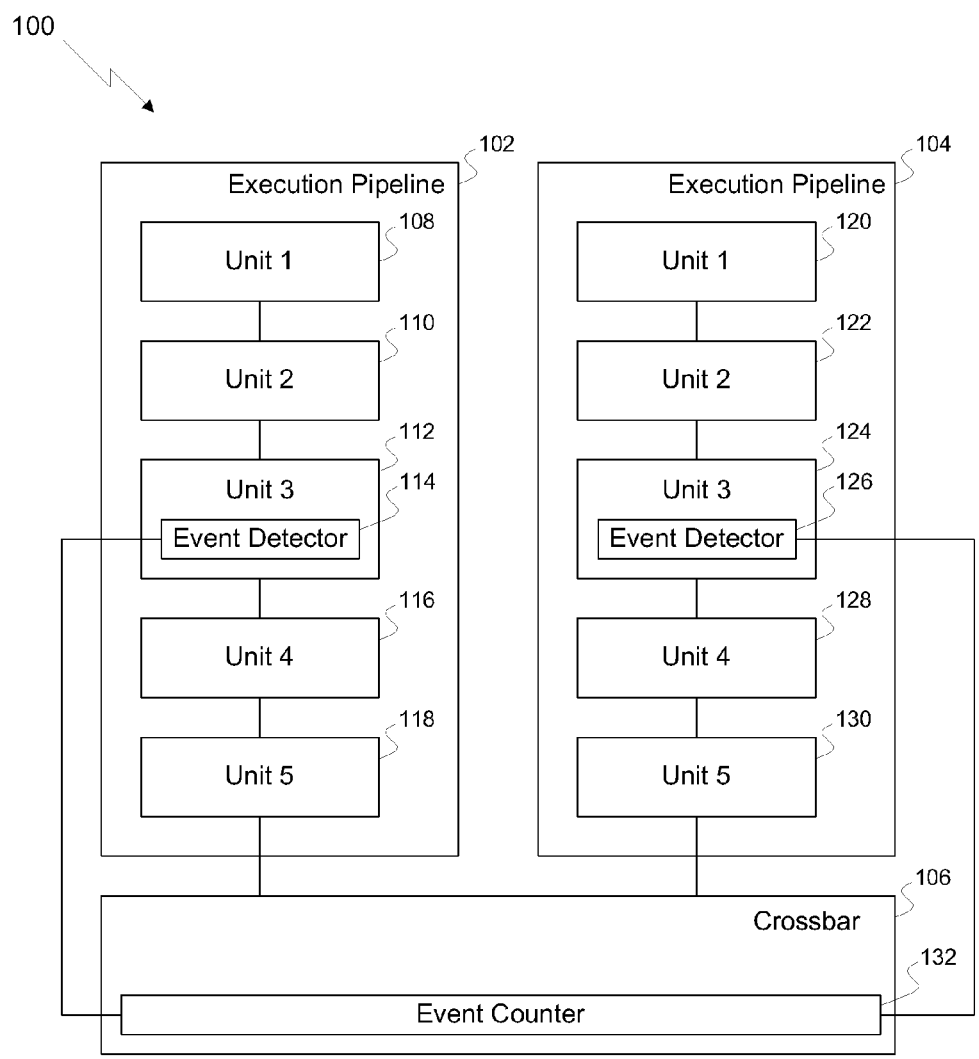
FIG. 1 illustrates a conventional event reporting mechanism in a programmable graphics processing pipeline.
Figure 2A:
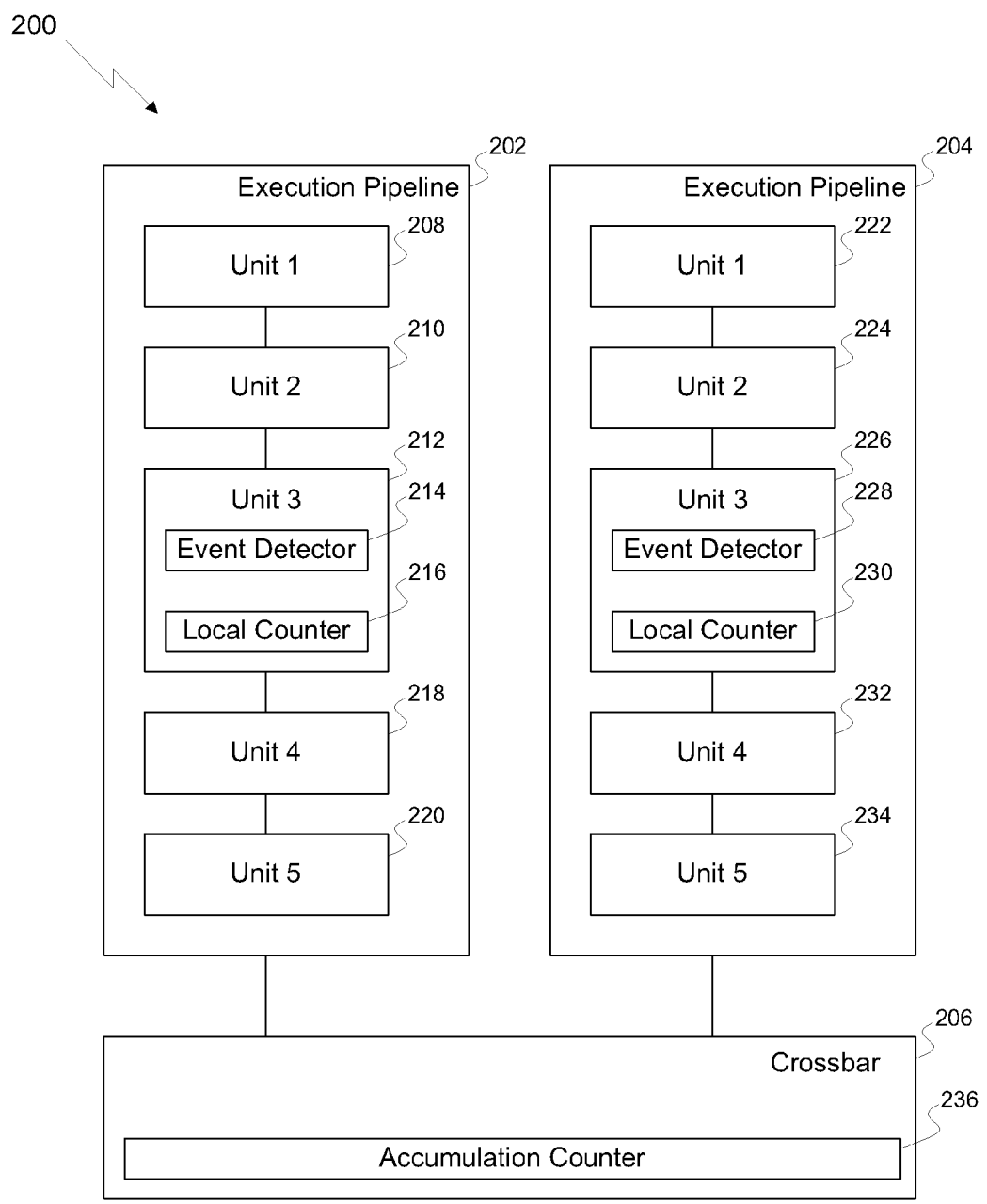
FIG. 2 illustrates an event reporting mechanism in a programmable graphics processing pipeline, according to an embodiment of the present invention.
Figure 2B:
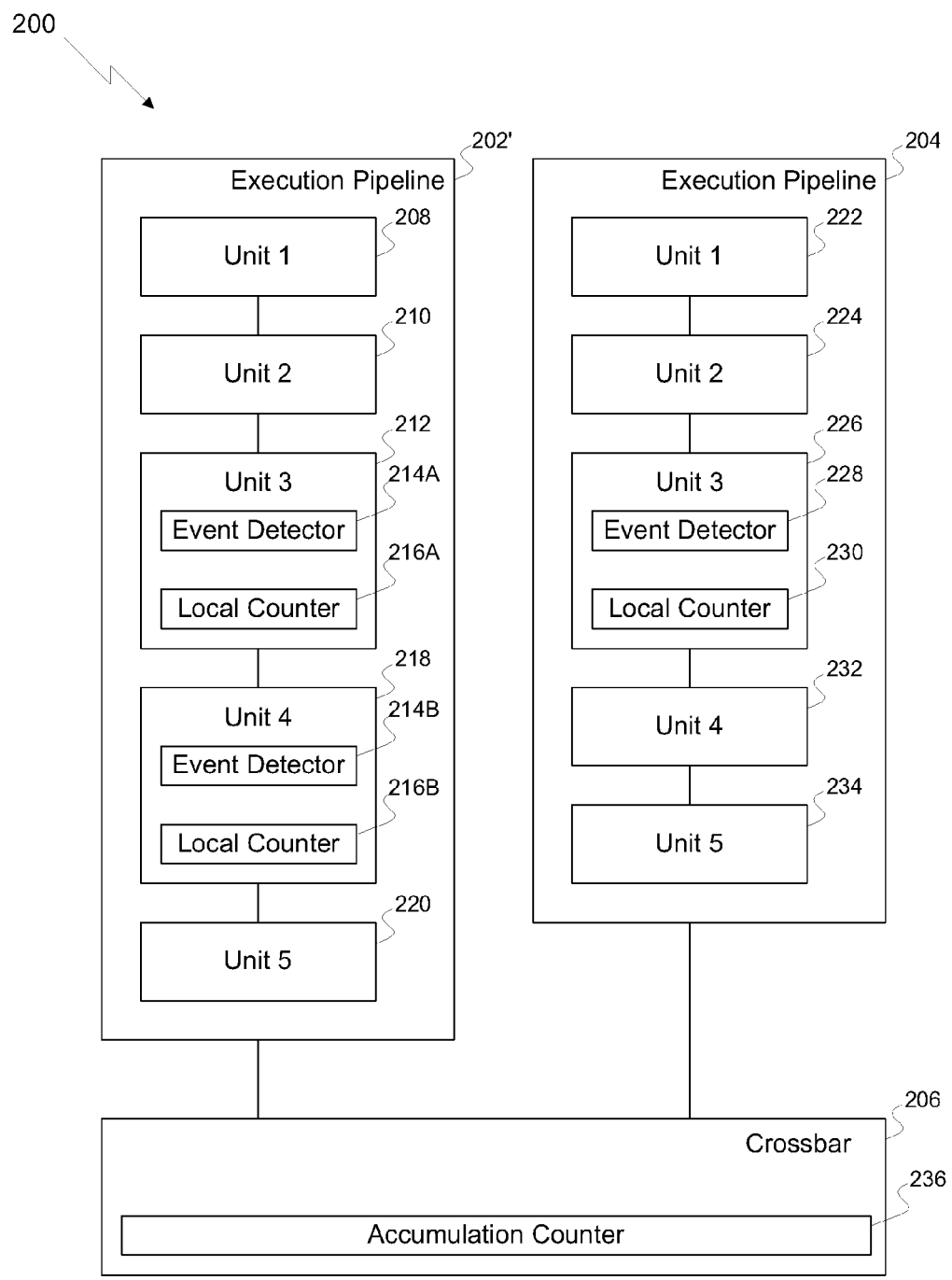

FIG. 2 illustrates an event reporting mechanism in a programmable graphics processing pipeline 200, according to an embodiment of the present invention. The programmable graphics processing pipeline 200 shown in FIG. 2 has been simplified for purposes of illustrating the event reporting mechanism according to an embodiment of the present invention. The programmable graphics pipeline 200, as shown, includes execution pipelines 202, 204 and a crossbar 206. The execution pipeline 202 has multiple stages and includes a first stage 208, a second stage 210, a third stage 212 that includes an event detector 214 and a local counter 216, a fourth stage 218 and a fifth stage 220. The execution pipeline 204 has multiple stages and includes a first stage 222, a second stage 224, a third stage 226 that includes an event detectors 228 and a local counter 230, a fourth stage 232 and a fifth stage 234. The crossbar 206 includes an accumulation counter 236. The local counters 216, 230 are configured as m-bit counters (e.g., 32-bit counter) and the accumulation counter 236 is configured as an n-bit high precision counter (e.g., 64-bit counter).

As an instruction is executed in the execution pipelines 202, 204, a reportable event may occur in one or both of them. When the reportable event does occur, the event is detected by an event detector (e.g., the event detector 214 or 228) and the local counter associated with that event detector is incremented. For example, when a reportable event occurs in stage 212 of the execution pipeline 202, the event detector 214 detects the event and increments the local counter 216. Similarly, when a reportable event occurs in stage 226 of the execution pipeline 204, the event detector 228 detects the event and increments the local counter 230.

In the embodiments of the present invention illustrated in FIG. 2, two execution pipelines of a programmable graphics processing pipeline are shown and five pipeline stages are shown for each of the execution pipelines. The present invention is, however, generally applicable to a programmable graphics processing pipeline with any number of execution pipelines, even one, and any number of pipeline stages per execution pipeline. Also, the present invention may be practiced with any processing unit that has one or more execution pipelines configured for graphics processing.

One example of a reported event is the "Z pass pixel count." As previously described, the Z pass pixel count represents the number of Z pixels that pass the Z test, which may occur for pixels that are eventually rendered and thus reach the crossbar after the end of the pipeline, as well as pixels that are not rendered because they are obstructed by other pixels, causing the obstructed pixels to be discarded in the Z-cull unit. Placing an event detector and an event counter in a pipeline stage that performs the Z test and prior to the Z-cull unit allows all pixels that pass the Z-pass test, including the culled pixels, to be counted prior to being discarded in the Z-cull unit.

Another example of a reported event is pixel shader invocations. Since graphics processing units (GPUs) typically include a plurality of pixel shaders, reporting a count of all pixel shader invocations across the GPU involves detecting and reporting events from each pixel shader in the GPU. Placing an event detector and an event counter in each pixel shader allows the invocations of the pixels shaders to be counted. Transmitting the invocation count for each pixel shader through its respective execution pipeline to the crossbar allows the total count to be summed at an accumulation counter and reported.

At any time during graphics processing, the API may request reporting of an event count for an event type. The process of reporting the event count involves the steps of triggering each local counter that corresponds to the requested event type to communicate its count value to the crossbar 206, receiving the count values at the crossbar 206, and processing them to generate a reportable result. The crossbar 206 generates the reportable result using the accumulation counter 236, which adds the count values received at the crossbar 206 to a free-running count value for the event type stored in the accumulation counter 236.

The local counters for the requested event type are triggered to communicate their count values to the accumulation counter 236 by a report token that is passed through the execution pipeline. When a report token reaches a pipeline stage that includes a local counter corresponding to the report token, the pipeline stage reads the value of the count from the local counter, encodes this value into a count token for injection into the execution pipeline, and resets the local counter. Just before the count token is injected into the execution pipeline, a pipeline bubble is created tin the execution pipeline ahead of the report token and the count token is injected into the pipeline bubble. Once injected into the execution pipeline, the count token propagates to the crossbar 206 through the execution pipeline.

For example, when the pipeline stage 212 receives a report token that corresponds to the event type for the local counter 216, the pipeline stage 212 encodes the value of the local counter 216 into a count token, creates a pipeline bubble ahead of the report token in the pipeline stage 212, inserts the count token into the pipeline bubble, resets the local counter 216, and allows the count token to propagate from pipeline stage 212 through pipeline stages 218 and 220 and finally to the crossbar 206. When the count token arrives at the crossbar 206, the count token is decoded to extract the encoded count value, and the decoded count value is added to the free-running accumulated count in the accumulation counter 236.

Similarly, when the pipeline stage 226 receives a report token that corresponds to the event type for the local counter 236, the pipeline stage 226 encodes the value of the local counter 236 into a count token, creates a pipeline bubble ahead of the report token in the pipeline stage 226, inserts the count token into the pipeline bubble, resets the local counter 236, and allows the count token to propagate from pipeline stage 226 through pipeline stages 232 and 234 and finally to the crossbar 206. When the count token arrives at the crossbar 206, the count token is decoded to extract the encoded count value, and the decoded count value is added to the free-running accumulated count in the accumulation counter 236.

The methods for creating a pipeline bubble and injecting a count token into the pipeline bubble are well known to those skilled in the art, and thus, for simplicity, a detailed description of such methods is not provided herein.

In the above examples, each count token is inserted in a pipeline bubble ahead of its corresponding report token. In this manner, it is ensured that all count tokens will arrive at the crossbar 206 prior to their corresponding report token, even if there is more than one event detector within the same execution pipeline. Once all report tokens have been received for a requested report, the crossbar 206 stores the value of the accumulation counter 236 in a memory location specified by the API in the report token.

The local counters are configured to be lower precision (e.g., 32-bit) than the accumulation counter (e.g., 64-bit). This saves on hardware cost, but is also presents a possibility that the local counter may overflow before a report is requested from that local counter. Overflow of the local counters is avoided by injecting a count token in the execution pipeline when a counter saturates (i.e. reaches it maximum value), without the presence of a report token to trigger the injecting of the count token. When a local counter within a pipeline stage saturates, the pipeline stage creates a pipeline bubble, injects a count token into the pipeline bubble, and resets the local counter, as previously described. The count token than propagates through the execution pipeline and reaches the accumulation counter in the crossbar 206. With this configuration, the designer can balance the cost of implementing local counters of various precisions against the small performances penalties associated with injecting count tokens into the pipeline when the local counters saturate.

The report token described above has three components that enable the event reporting mechanism to perform as described. A first component is a plurality of bits that indicates the function of the token (e.g., a report token) as distinguished from other tokens that propagate through the pipeline, such as execution tokens. A second component is a plurality of bits that indicate the event type whose report is requested. A third component is a destination address to which the accumulated count is written. This destination address is specified by the API when it requests a report. When the report token reaches a pipeline stage with an event counter (e.g., pipeline stage 212 or 226), the pipeline stage determines whether the event type encoded in the report token corresponds to the type of event counted by the event counter. If the encoded event type matches the counter event type, the pipeline stage creates a pipeline bubble, injects a count token into the pipeline bubble, and resets the local counter, as previously described.

The event reporting mechanism according to embodiments of the present invention also supports reporting a plurality of event types. For example, the event detector 214 may be configured to report an event of a first type and the event detector 228 may be configured to report an event of a second type. When a report token that corresponds to the first type is transmitted down the execution pipelines 202, 204, the count value of the local counter 216 will be encoded, injected into the execution pipeline 202, and reset, but the count value of the local counter 230 will be unaffected by such a report token. By contrast, when a report token that corresponds to the second type is transmitted down the execution pipelines 202, 204, the count value of the local counter 230 will be encoded, injected into the execution pipeline 204, and reset, but the count value of the local counter 216 will be unaffected by such a report token.

Figure 3:
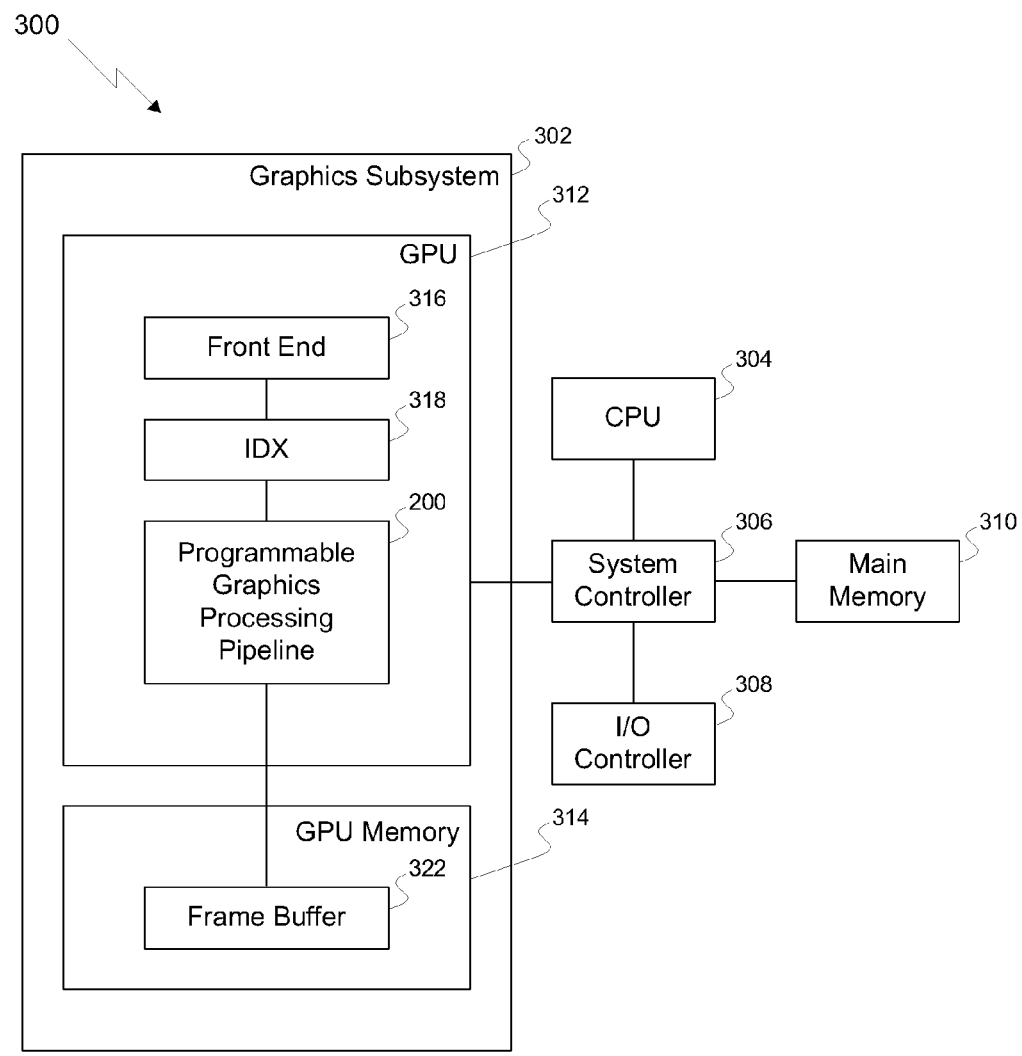
FIG. 3 illustrates a computing device in which embodiments of the present invention can be practiced.

FIG. 3 illustrates a computing device 300 in which embodiments of the present invention can be practiced. The computing device 300 includes a graphics subsystem 302, a central processing unit (CPU) 304, a system controller 306 (also known as a Northbridge™), a main memory 310, and an I/O controller 308 (also known as a Southbridge™). The graphics subsystem 302 includes a GPU 312 and a GPU memory 314. The GPU memory 314 includes a frame buffer 322, which stores graphics data generated by the GPU 312. The GPU 312 includes a GPU front end 316, which fetches instructions, an instructions dispatch unit (IDX) 318, which schedules instructions from the front end 316 for execution, the programmable graphics pipeline 200, which executes instructions scheduled by the IDX 318, and a raster operations unit, which receives the results of the instructions executed in the programmable graphics processing pipeline 200 and updates the graphics data in the frame buffer 322 accordingly.

Figure 4:
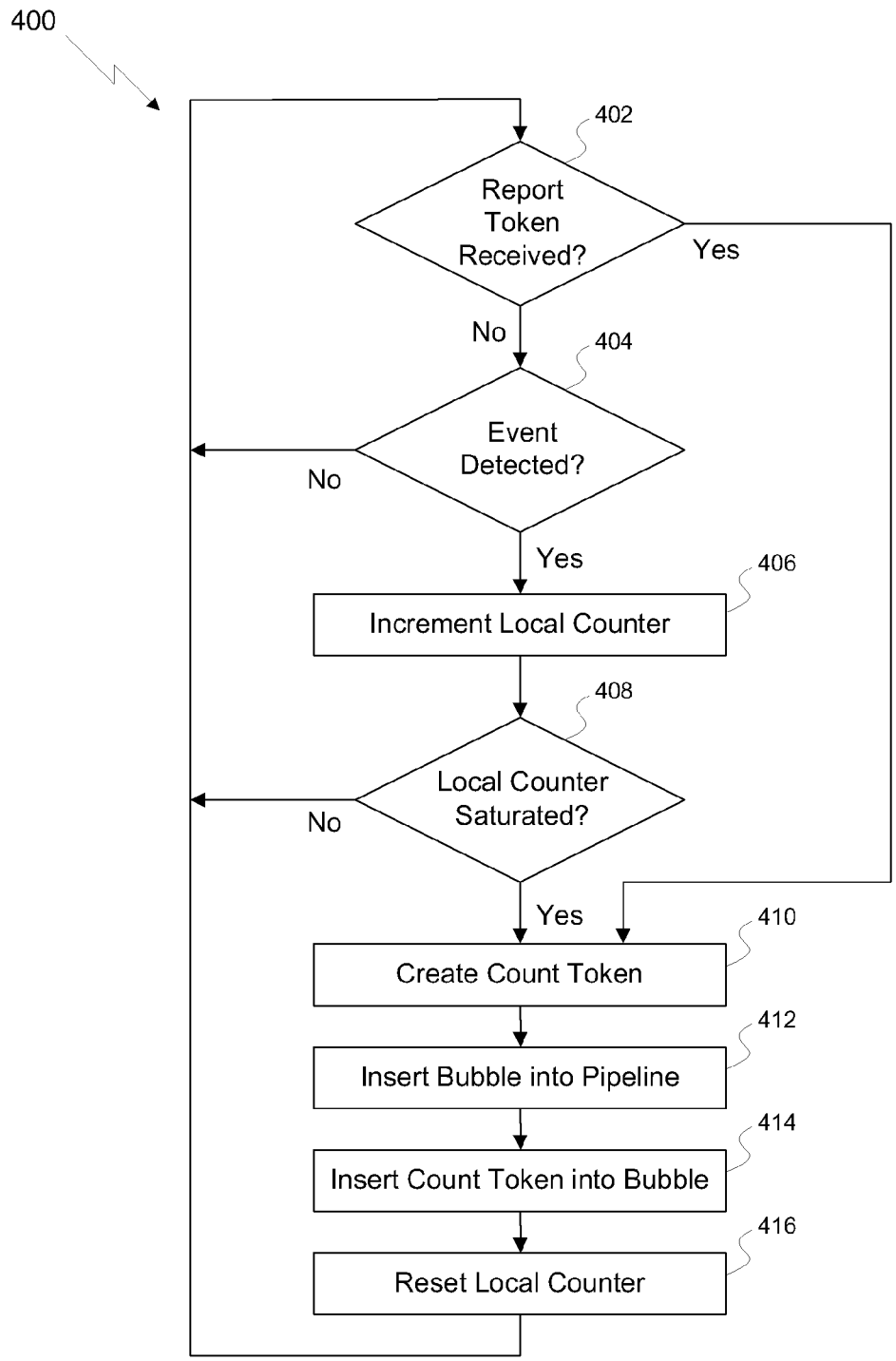
FIG. 4 illustrates a flowchart of a method for counting events in a programmable graphics processing pipeline, in accordance with an embodiment of the present invention.

FIG. 4 illustrates a flowchart of a method 400 for counting events in a pipeline stage (e.g., pipeline stage 212 or 226) and transmitting count values from a pipeline stage to a crossbar.

As shown, the method 400 begins at step 402 where the pipeline stage loops through steps 402 and 404 until a report token is received from the execution pipeline or an event is detected within the pipeline stage. In step 402, the pipeline stage determines whether the current token is a report token. If the current token is not a report token, the method continues to step 404 where the pipeline stage determines whether the event detector detected an event. If the event detector does not detect an event, the method loops back to step 402, where a next token is evaluated.

Returning to step 404, if the event detector determines that an event is detected, the local counter associated with that event detector is incremented (step 406). In step 408, the pipeline stage determines whether the local counter has saturated. If the local counter has not saturated, it is able to count additional events, so the method loops back to step 402, where a new token is evaluated. On the other hand, if the pipeline stage determines that the local counter has saturated, the local counter is unable to count additional events, so its value is transmitted to the corresponding accumulation counter in steps 410, 412 and 414 by injecting a count token into the execution pipeline. In step 410, the pipeline stage creates a count token that includes an encoded form of the saturated count value. In step 412, the pipeline stage inserts a pipeline bubble into the execution pipeline as previously described. In step 414, the count token created in step 410 is inserted into the pipeline bubble created in step 412, allowing the count token to propagate to the crossbar 206. After inserting the count token into the pipeline bubble, the pipeline stage resets the local counter in step 416 and loops back to step 402, where a next token is evaluated.

Returning to step 402, if the current token is a report token, steps 410, 412, 414 and 416 are carried out as previously described. When carrying out step 412, the pipeline stage ensures that the pipeline bubble is inserted ahead of the report token.

Figure 5:
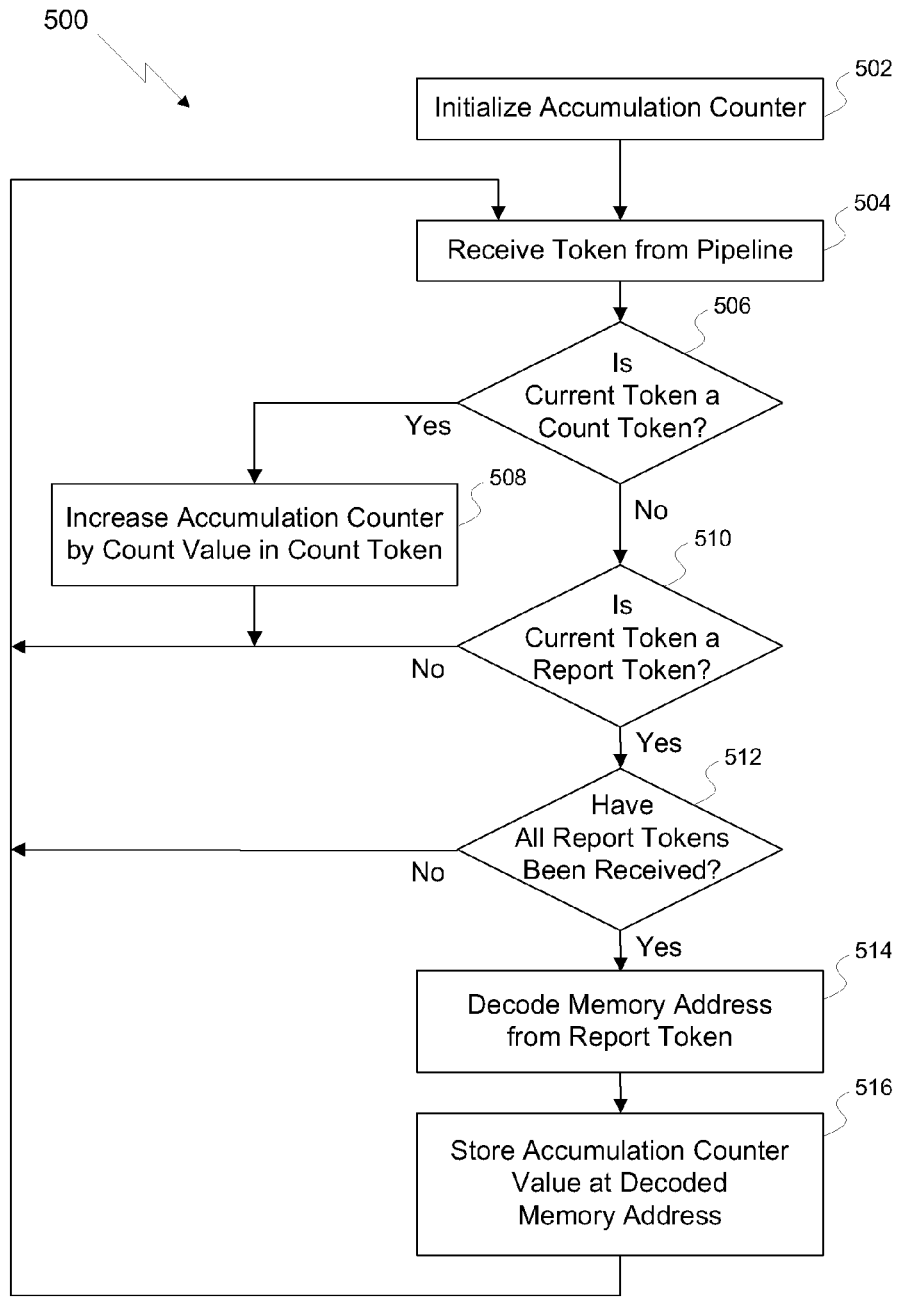
FIG. 5 illustrates a flowchart of a method for processing report tokens and count tokens by an accumulation counter.

FIG. 5 illustrates a flowchart of a method 500 for processing report tokens and count tokens with the accumulation counter 236. As shown, the method 500 begins at step 502, where the crossbar 206 initializes the accumulation counter 236 in preparation for receiving count tokens in subsequent steps. Next, the method continues by looping through steps 504, 506 and 510 until a count token or a report token is received from an execution pipeline.

In step 504, a current token is received from the execution pipeline. In step 506, the crossbar 206 determines whether the current token is a count token. If it is, the accumulation counter 236 is increases its count value by the count value of the count token (step 508), and the method loops back to step 504, where a next token is received for evaluation. If the current token is not a count token, the crossbar 206 determines whether the current token is a report token (step 510). If the current token is not a report token, the method loops back to step 540, where a next token is received for evaluation. If the crossbar 206 determines that the current token is a report token, the crossbar 206 determines whether all report tokens for the current report have been received (step 512). If all report tokens for the current report have been received, it is determined that the accumulation of local counter values in the accumulated counter 236 is now complete, and the crossbar 206 decodes from the report token the memory address where the accumulated counter value is to be stored. In step 516, the accumulated counter value is stored at the decoded memory address, and the method loops back to step 504, where another token is received for evaluation. Returning back to step 512, if all report tokens for the current report have not been received, the method loops back to step 504, where another token is received for evaluation.

While the foregoing is directed to embodiments of the present invention, other and further embodiments of the invention may be devised without departing from the basic scope thereof. The scope of the present invention is determined by the claims that follow.

We claim:

1. A computing device configured for operation with an operating system that includes an application programming interface (API) for graphics processing, said computing device comprising:
    a first execution pipeline that includes a first stage;
    a second execution pipeline that includes a second stage and a third stage;
    a first event detector within the first execution pipeline for monitoring the first stage for a first specified event;
    a second event detector within the second execution pipeline for monitoring the second stage for the first specified event;
    a third event detector within the second execution pipeline for monitoring the third stage for a second specified event;
    a first m-bit counter that is incremented when the first event detector detects the first specified event at the first stage;
    a second m-bit counter that is incremented when the second event detector detects the first specified event at the second stage;
    a third n-bit counter that is incremented when the third event detector detects the second specified event at the third stage; and
    an n-bit accumulation counter configured to:
        receive a count value from the first m-bit counter, the second m-bit counter, and the third m-bit counter,
        add the received count value from the first counter and the second counter to a current count value associated with the first specified event,
        add the received count value from the third counter to a current count value associated with the second specified event, and
        report the current count value associated with the first specified event and the current count value associated with the second specified event in response to a request from the API,
    wherein n>m, the first m-bit counter is configured to transmit the count value into the first execution pipeline when the first m-bit counter has saturated, and the second m-bit counter is configured to transmit the count value into the second execution pipeline when the second m-bit counter has saturated.

2. The computing device according to claim 1, wherein each m-bit counter is configured to transmit its count value into the execution pipeline associated with the m-bit counter when a token of a certain type is received at the stage associated with the m-bit counter.

3. The computing device according to claim 2, wherein the token of the certain type is a report token instructing the m-bit counter to report its count value to the n-bit accumulation counter.

4. The computing device according to claim 3, wherein the count value is transmitted into the execution pipeline associated with the m-bit counter as a count token that is positioned ahead of the report token.

5. The computing device according to claim 3, wherein the report token is generated in response to the request from the API.

6. A processing unit comprising:
    a first execution pipeline that includes a first stage;
    a second execution pipeline that includes a second stage and a third stage;
    a first event detector within the first execution pipeline for monitoring the first stage for a first specified event;
    a second event detector within the second execution pipeline for monitoring the second stage for the first specified event;
    a third event detector within the second execution pipeline for monitoring the third stage for a second specified event;
    a first counter that is incremented when the first event detector detects the first specified event at the first stage;
    a second counter that is incremented when the second event detector detects the first specified event at the second stage;
    a third counter that is incremented when the third event detector detects the second specified event at the third stage; and
    an accumulation counter configured to:
        receive a count value from each of the first counter, the second c counter, and the third counter,
        add the received count value from the first counter and the second counter to a current count value associated with the first specified event,
        add the received count value from the third counter to a current counter value associated with the second specified event, and
        report the current count value associated with the first specified event and the current count value associated with the second specified event,
    wherein each of the first and second counters is configured to transmit its count value into its respective execution pipeline for receipt by the accumulation counter when the respective one of the first and second counters has saturated.

7. The processing unit according to claim 6, wherein the first counter is configured to transmit its count value into its respective execution pipeline for receipt by the accumulation counter when a first report token instructing the first counter to report its count value to the accumulation counter is received at the first stage, and the second counter is configured to transmit its count value into its respective execution pipeline for receipt by the accumulation counter when a second report token instructing the second counter to report its count value to the accumulation counter is received at the second stage.

8. The processing unit according to claim 7, wherein the count value of the first counter is transmitted into the execution pipeline corresponding to the first counter as a first count token that is positioned ahead of the report token, and the count value of the second counter is transmitted into the execution pipeline corresponding to the second counter as a second count token that is positioned ahead of the report token.

9. The processing unit of claim 6, wherein the size of the accumulation counter is greater than the size of either the first counter or the second counter.

* * * * *

UNITED STATES PATENT AND TRADEMARK OFFICE
CERTIFICATE OF CORRECTION

PATENT NO.       : 7,519,797 B1                                          Page 1 of 1
APPLICATION NO.  : 11/556020
DATED            : April 14, 2009
INVENTOR(S)      : Stiehl et al.

It is certified that error appears in the above-identified patent and that said Letters Patent is hereby corrected as shown below:

In column 8, line 26, please replace "second c counter" with --second counter--.

Signed and Sealed this

Tenth Day of November, 2009

David J. Kappos
*Director of the United States Patent and Trademark Office*